United States Patent [19]

Ida et al.

[11] Patent Number: 5,277,604

[45] Date of Patent: Jan. 11, 1994

[54] CLOCK SPRING CONNECTOR

[75] Inventors: Yuichi Ida, Miyagi; Hironori Kato, Sendai; Kunihiko Sasaki, Miyagi; Hiroyuki Bannai, Furukawa, all of Japan

[73] Assignee: Alps Electric Co., Ltd., Tokyo, Japan

[21] Appl. No.: 75,003

[22] Filed: Jun. 10, 1993

Related U.S. Application Data

[63] Continuation of Ser. No. 856,778, Mar. 24, 1992, abandoned.

[30] Foreign Application Priority Data

Apr. 5, 1991 [JP] Japan ................. 3-099779
Jun. 3, 1991 [JP] Japan ................. 3-157449
Jul. 4, 1991 [JP] Japan ................. 3-189593

[51] Int. Cl.⁵ ............................... H01R 39/02
[52] U.S. Cl. ........................... 439/164; 439/15
[58] Field of Search ..................... 439/15, 164

[56] References Cited

U.S. PATENT DOCUMENTS

| | | |
|---|---|---|
| 3,763,455 | 10/1973 | Confer et al. . |
| 4,540,223 | 9/1985 | Schmerda et al. . |
| 4,921,428 | 5/1990 | Sasaki et al. ............ 439/15 |
| 5,026,289 | 6/1991 | Matsumoto et al. . |
| 5,046,951 | 9/1991 | Suzuki . |
| 5,102,061 | 4/1992 | Suzuki et al. .......... 439/15 X |

FOREIGN PATENT DOCUMENTS 0236977  9/1990  Japan ................. 439/164

Primary Examiner—Eugene F. Desmond
Attorney, Agent, or Firm—Guy W. Shoup; Patrick T. Bever

[57] ABSTRACT

Disclosed is a clock spring connector in which a flexible cable is wound reversely on inner and outer cylindrical units through a U-shaped turned-back portion within an air space defined by these cylindrical units, and a plurality of rollers connected by connecting plates are disposed. A radial movement of the flexible cable is regulated by the rollers connected by the connecting member. A tight-wind or rewind operation of the flexible cable can be surely effected. The connecting member prevents the adjacent rollers from impinging on each other.

9 Claims, 14 Drawing Sheets

CLOCK SPRING CONNECTOR

This application is a continuation of application Ser. No. 07/856,778, filed Mar. 24, 1992, now abandoned.

BACKGROUND OF THE INVENTION

1. Field of the Invention

The present invention relates to a clock spring connector applied to a steering device or the like of an automobile, wherein an electrical connection between a fixed member and a movable member is performed by use of a flexible cable.

2. Related Background Art

In a clock spring connector, a fixed member is connected through a flexible cable to a movable member so mounted as to be rotatable relative to this fixed member. The clock spring connector is employed as an electrical connecting means between the fixed member and the movable member having a finite number of revolutions as in the case of a steering device of an automobile.

In this type of clock spring connector, the flexible cable is high in terms of percentage of occupying the total costs. Proposed in the specification of U.S. Pat. No. 3,763,455 is a clock spring connector constructed to reduce the costs by decreasing a length of a flexible cable needed.

FIG. 26 is a plan view schematically illustrating a construction of the clock spring connector disclosed in the aforementioned patent specification. As shown in the same figure, a movable member 101 is so mounted as to be rotatable relative to a cylindrical fixed member 100. Flexible cables 103, 104 are housed in an ring-like air space 102 defined by the fixed member 100 and the movable member 101. These flexible cables 103, 104 are led to the outside of the air space 102 in such a state that the cables are fixed respectively to the fixed member 100 and the movable member 101. The flexible cables are accommodated in the air space 102 in a state where the cables are wound on an outer cylindrical unit of the fixed body 100 and on an inner cylindrical unit of the movable 101 in winding directions reverse to each other. A U-shaped turned-back portion is formed in the position where the winding direction is turned back. Further, groups of a plurality of rollers 105, 106 are disposed in the peripheral direction in the air space 102. The turned-back portion of the flexible cable 103 is looped with one group of the rollers 105, while the turned-back portion of the flexible cable 104 is looped with the other group of the rollers 106.

In the thus constructed clock spring connector, when, e.g., the movable member 101 is rotated clockwise in FIG. 26, the turned-back portions of the flexible cables 103, 104 also move in the peripheral direction of the air space 102. The flexible cables 103, 104 are rewound on the outer cylindrical unit of the fixed member 100 in a denser winding state. In reverse to this, when the movable member 101 is rotated counterclockwise in FIG. 26, the turned-back portions of the flexible cables 103, 104 also move in the same direction. The flexible cables 103, 104 are tightly wound on the inner cylindrical unit of the movable member 101 more densely. Note that during such a tight-wind or rewind operation, the respective rollers 105, 106 undergo the force given from the turned-back portions of the flexible cables 103, 104 and thereby move in the same direction.

According to the clock spring connector in the conventional example described above, the winding directions of the flexible cables are reversed with respect to the inner and outer cylindrical units. Hence, the lengths of the flexible cables required can be remarkably decreased as well as reducing the costs as compared with such a clock spring connector that the flexible cables are wound (in an eddy state) on the inner and outer cylindrical units in the same direction. Besides, the plurality of rollers are disposed between the inner cylindrical unit wound with the flexible cable and the outer cylindrical unit wound with the flexible cable. The flexible cables can be thereby regulated in the radial direction over the entire periphery of the ring-like air space. The tight-wind or rewind operation can be performed smoothly.

However, a dimension (indicated by the symbol L in FIG. 26) between the flexible cable wound on the inner cylindrical unit and the flexible cable wound on the outer cylindrical unit fluctuates depending on the winding states of the flexible cables. The dimension L becomes maximum when all the flexible cables are rewound on the outer cylindrical unit having a larger diameter. Whereas if all the flexible cables are wound tightly on the inner cylindrical unit having a smaller diameter, the dimension L becomes minimum. For this reason, even when the plurality of rollers are closely disposed in the air space on the assumption that the dimension L is minimum, and if the flexible cable is rewound densely on the outer cylindrical unit to increase the dimension L, backlashes are produced between the respective rollers and the flexible cables. On the other hand, a dimension (indicated by the symbol M in FIG. 26) in the peripheral direction of the air space defined by the flexible cable wound on the inner cylindrical unit and by the flexible cable wound on the outer cylindrical unit also fluctuates depending on the winding states of the flexible cables. When the all the flexible cables are rewound on the outer cylindrical unit having the larger diameter, the dimension M becomes minimum. Whereas if all the flexible cables are wound tightly on the inner cylindrical unit having the smaller diameter, the dimension M becomes maximum. For this reason, even when the rollers are closely disposed in the air space on the assumption that the dimension M is minimum, and if the flexible cables are wound tightly on the inner cylindrical unit to increase the dimension M, the backlashes are produced between the adjacent rollers. Hence, there arises such a problem that the rollers impinge on each other to cause strange noises due to those backlashes.

Further, when rotating the movable member in a state where the backlashes, as described above, exist between the respective rollers—especially when rotating the movable member in the rewinding direction, the flexible cable wound on the inner cylindrical unit swells towards the outer cylindrical unit on the way to the turned-back portion in such a place that a gap in the peripheral direction between the adjacent rollers is widened. The flexible cable then sinks in this gap. A problem is also caused, wherein this swelled part is buckled due to a further rotation of the movable member, resulting in a damage to the flexible cable.

In addition, although the force to cause the rotation in the same direction acts on all the rollers because of the contact with the flexible cable, the respective rollers rotate in the directions opposite to each other in such a place that the adjacent rollers are contact each other. Consequently, there is caused a problem in which the rotations of the rollers are offset, and a motion of the flexible cable is unsmooth.

Furthermore, it is required that a clearance for smoothing the movement of the flexible cable 103 be provided between the upper crosswise end of the flexible cable 103 and the top surface of the air space 102. However, a curvature of a turned-back portion 103a of the flexible cable 103 is remarkably smaller than others, and hence the turned-back portion 103a somewhat swells crosswise. This swollen part rubs against the top and bottom surfaces of the air space 102 during its movement. This causes a problem in which the flexible cable 103 can not be led out smoothly through the turned-back portion 103a.

SUMMARY OF THE INVENTION

It is a primary object of the present invention to provide a clock spring connector capable of preventing buckling of a flexible cable, enhancing the reliability with smooth rotations and reducing the noises.

In the clock spring connector according to the present invention, a plurality of rollers disposed in a ring-like air space are connected by a connecting member. A flexible cable is not buckled on the way to a turned-back portion from two cylindrical units because of those rollers. There is also no possibility in which noises are not caused due to impingements of the rollers on each other. Besides, the clock spring connector includes a guide means for guiding the plurality of rollers only in the peripheral direction of the air space, whereby the respective rollers can smoothly follow up a movement of the turned-back portion. Further, the clock spring connector of this invention includes a ring-like recessed groove formed in at least one of the top and bottom surfaces of the air space. A slide resistance of the turned-back portion is reduced owing to this recessed groove. The flexible cable is smoothly led out through the turned-back portion.

BRIEF DESCRIPTION OF THE DRAWINGS

Other objects and advantages of the present invention will become apparent during the discussion taken in conjunction with the accompanying drawings, in which.

DETAILED DESCRIPTION OF THE PREFERRED EMBODIMENTS

Figure 1:
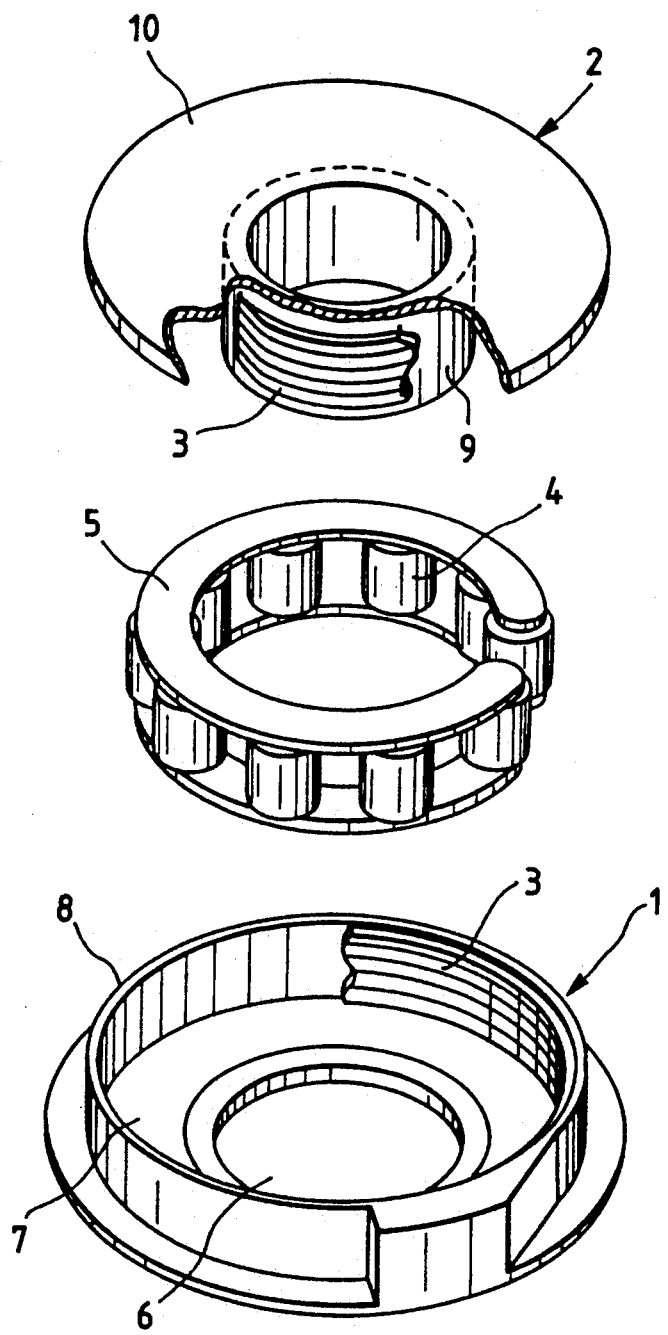
FIG. 1 is an exploded perspective view illustrating a clock spring connector with some portions broken away in a first embodiment of the present invention.
Figure 2:
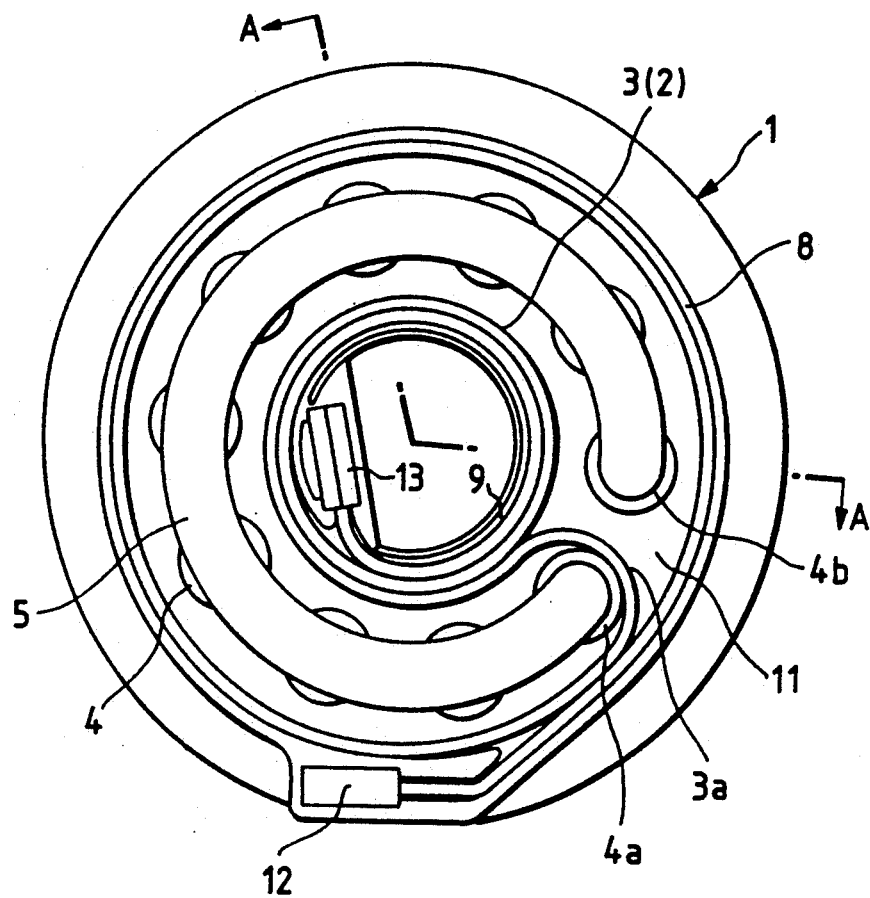
FIG. 2 is a plan view depicting the clock spring connector, wherein an upper case is partly omitted.
Figure 3:
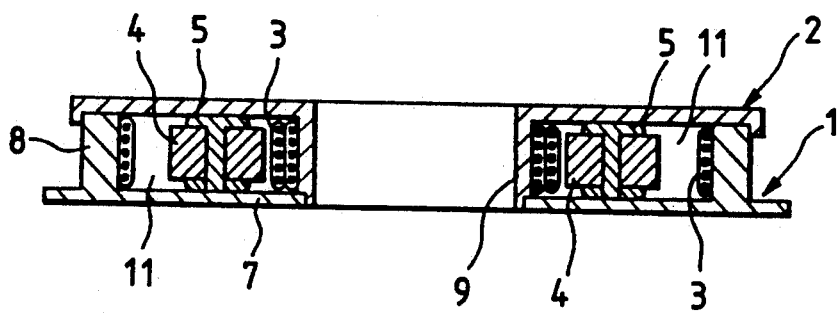
FIG. 3 is a sectional view taken substantially along the line A—A of FIG. 2.

The present invention will hereinafter be described by way of embodiments with reference to the drawings. FIG. 1 is an exploded perspective view illustrating a clock spring connector with some portions broken away in a first embodiment of the present invention. FIG. 2 is a plan view depicting the clock spring connector, wherein an upper case is partly omitted. FIG. 3 is a sectional view taken substantially along the line A—A of FIG. 2.

As illustrated in these Figures, the clock spring connector in accordance with this embodiment is constructed substantially of a lower case 1, an upper case 2 so mounted as to be rotatable relative to this lower case 1; a flexible cable 3 accommodated in between the two cases 1, 2, a plurality of rollers disposed in an area defined by this flexible cable 3 and a C-shaped connecting plate for connecting these rollers 4.

The lower case 1 includes a bottom plate 7 bored with a center hole 6 at its center and an outer cylindrical unit 8 standing erect along the outer periphery of this bottom plate 7. The lower case 1 assumes a bottomed cylindrical configuration on the whole. On the other hand, the upper case 2 includes a top plate 10 having its central part from which an inner cylindrical unit 9 is provided pendently. The inner cylindrical member 9 is guided by the center hole 6, and an outer circumference of the top plate 10 is guided by the outer cylindrical unit 8, whereby the upper case 2 is so connected as to be rotatable relative to the lower case 1. An air space 11 assuming a ring-like shape in plan is defined by the bottom plate 7 and the outer cylindrical unit 8 of the lower case 1 and by the top plate 10 and the inner cylindrical unit 9 of the upper case 2.

The flexible cable 3 is composed of a so-called flat cable formed by laminating conductors parallel to each other with a pair of insulating films. This embodiment involves the use of a flat cable in which five conductors are embedded. As illustrated in FIG. 2, one end of the flexible cable 3 is connected to a first connector 12 fixed to the outer cylindrical unit 8 and further led to the outside of the lower case 1 through the first connector 12. On the other hand, the other end of the flexible cable 3 is connected to a second connector 13 fixed to the inner cylindrical unit 9 and further led to the outside of the outside of the upper case 2 through the second connector 13. Besides, the flexible cable 3 is wound counterclockwise on an inner wall of the outer cylindrical unit 8 from the first connector 12. The flexible cable 3 is turned around in a U-like shape (which will hereinafter be referred to as a turned-back portion 3a) The flexible cable 3 is further wound clockwise around the outer wall and is accommodated into the air space 11 so that the cable reaches the second connector 12.

A plurality of rollers 4 are disposed at constant intervals in the peripheral direction within the air space 11. Each roller 4 is rotatably interposed between a pair of connecting plates assuming a C-like configuration. The rollers are thus linked so as not to separate from each other. A diameter of each roller 4 is set larger than a radial width the connecting plate 5. Two rollers 4a, 4b among those rollers 4 are axially so supported at both ends of the connecting plate 5 as to be protruded somewhat. The foregoing turned-back portion 3a of the flexible cable 3 is looped around the roller 4a.

Next, the operation of the clock spring connector in accordance with the embodiment described above will be explained taking an example where the lower case 1 is used as a fixed member, while the upper case 2 is employed as a movable member. To start with, when the upper case 2 is rotated clockwise from the state shown in FIG. 2, the turned-back portion 3a of the flexible cable 3 moves clockwise by a rotational quantity smaller than the upper case 2, and the flexible cable 3 having a length equivalent to the above-mentioned moving quantity is led out of the outer cylindrical unit 8 and tightly wound on the inner cylindrical member 9. In this case, the turned-back portion 3a of the flexible cable 3 forces one roller 4a to move clockwise by dint of a small frictional resistance therewith, with the result that all the rollers 4 move clockwise as they remain connected to the connecting plates 5. Therefore, with the respective rollers 4 which move in this manner, the flexible cable 3 wound on the outer cylindrical unit 8 is prevented from swell-biasing in the inner radial direction. The flexible cable 3 on the side of the outer cylindrical unit 8 is smoothly led out towards the turned-back portion 3a and tightly wound on the inner cylindrical unit 9.

In reverse to the above-mentioned, when the upper case 2 is rotated counterclockwise from the position illustrated in FIG. 2, the turned-back portion 3a of the flexible cable 3 moves counterclockwise by a rotational quantity smaller than the upper case 2. The flexible cable 3 having a length equivalent to the moving quantity is led out of the inner cylindrical unit 9 and rewound on the outer cylindrical unit 8. In this case, the turned-back portion 3a of the flexible cable 3 forces the other roller 4b to move counterclockwise by dint of a small frictional resistance therewith, with the result that all the rollers 4 and the connecting plates 5 move counterclockwise. Hence, with the respective rollers 4 which thus move, the flexible cable 3 wound on the inner cylindrical unit 9 is prevented from swell-biasing in the outer radial direction. The flexible cable 3 on the side of the inner cylindrical unit 9 is smoothly led out towards the turned-back portion 3a and rewound on the outer cylindrical unit 8.

In the clock spring connector in accordance with the first embodiment, the flexible cable 3 is wound reversely on the outer and inner cylindrical units 8, 9 through the turned-back portion 3a. It is therefore possible to reduce the length of the flexible cable 3 required, as a result of which the total costs can be reduced. At the same time, this gives an advantage for miniaturization. Further, the plurality of rollers 4 are interposed between the flexible cable 3 wound on the outer cylindrical unit 8 and the one wound on the inner cylindrical unit 9. These rollers 4 are connected to the connecting plates 5 and move following up the turned-back portion 3a while keeping the constant intervals. Hence, during the tight-wind or rewind operation, the rotating force of the upper case 2 is surely transmitted to the turned-back portion 3a of the flexible cable 3, thereby preventing such an inconvenience that the flexible cable 3 swells in the radial direction and is buckled on the way to the turned-back portion 3a. Besides, the diameter of the roller 4 is set larger than the width dimension in the radial direction of the connecting plate 5. With the rotations of the rollers 4, the connecting plates 5 are smoothly rotationally moved by the flexible cable 3 without bringing the flexible cable 3 into a direct-contact with the connecting plates 5. Further, the two rollers 4a, 4b confront each other through the turned-back portion 3a of the flexible cable 3, and hence the frictional resistances between the turned-back portion 3a and the rollers 4a, 4b can be decreased. As a result, it is feasible to smoothly move the turned-back portion 3a and surely perform the tight-wind or rewind operation irrespective the rotational directions of the upper case 2.

Figure 4:
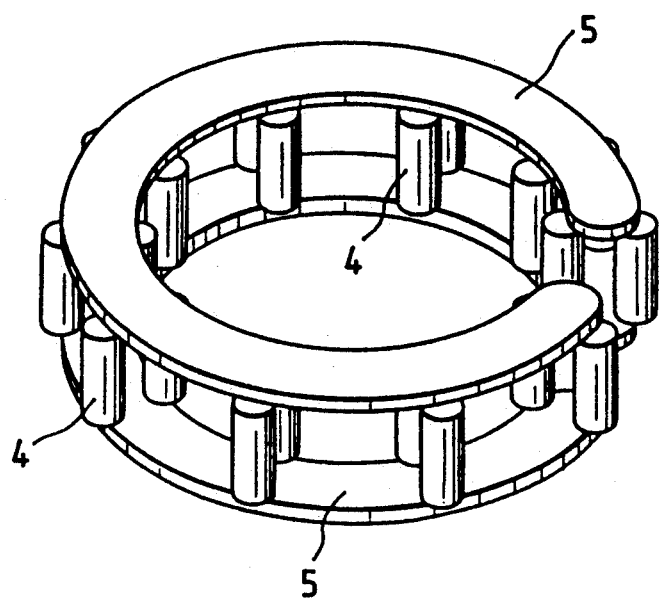
FIG. 4 is a perspective view showing an example of a variant form of rollers.

Note that the first embodiment has dealt with the case where the plurality of rollers 4 each having the diameter larger than the width dimension of the connecting plate 5 are axially supported between the pair of connecting plates 5. As depicted in FIG. 4, however, two lines of rollers 4 each having a small diameter may be axially supported between the pair of connecting plates 5, and the respective rollers 4 may protrude slightly from the outer and inner peripheral edges of the connecting plates 5.

Figure 5:
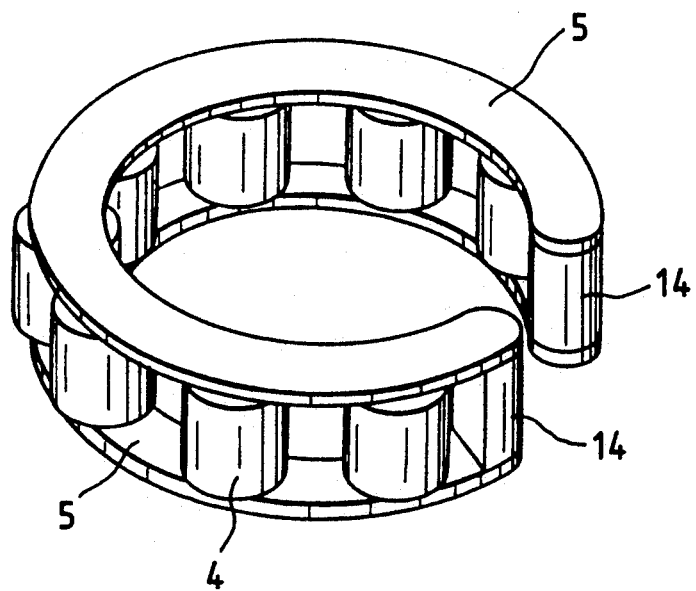
FIG. 5 is a perspective view showing an example of another variant form of the rollers.

Further, all the members linked through the connecting plates 5 are not necessarily the rollers 4. For instance, as illustrated in FIG. 5, the plurality of rollers 4 are axially supported between the pair of connecting plates 5, and, at the same time, curved members 14 each having a smooth peripheral surface may be fixed to both ends of these connecting plates 5. In this case, the frictional resistance between the turned-back portion 3a of the flexible cable 3 and the curved member 14 becomes somewhat larger than in the first embodiment. Nevertheless, almost the same effects with the first embodiment can be expected.

Figure 6:
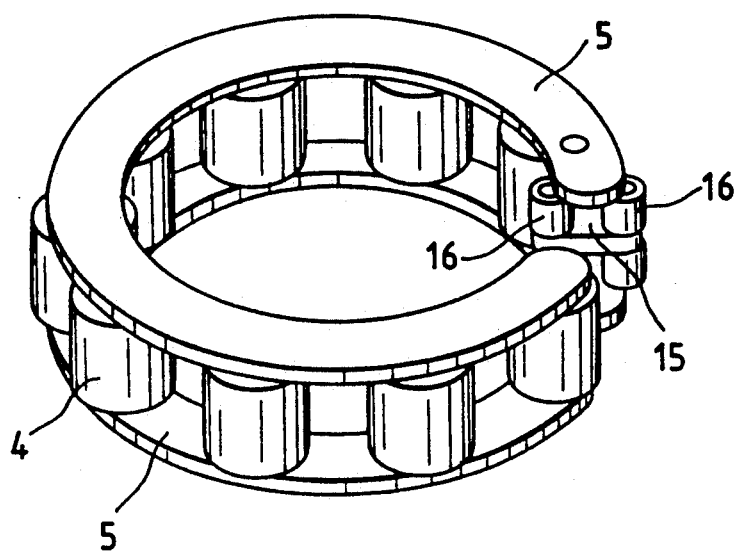
FIG. 6 is a perspective view showing an example of still another variant form of the rollers.
Figure 7:
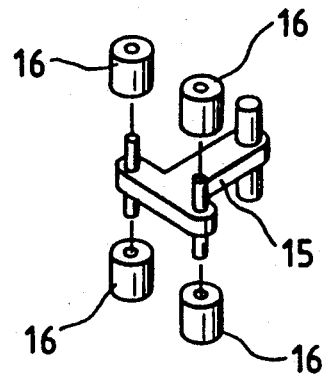
FIG. 7 is an exploded perspective view illustrating the principal portion of FIG. 6.

Besides, a position of the turned-back portion 3a of the flexible cable 3 moves also in the radial direction with the rotations of the upper case 2 (movable member). At that time, a guide member which follows up the radial motion of the turned-back portion 3a can be also provided on the inner periphery of the turned-back portion 3a of the flexible cable 3. More specifically, as illustrated in FIGS. 6 and 7, the proximal portion of an oscillation member 15 assuming a T-like configuration in plane is axially supported on one ends of the connecting plates 5. At the same moment, a plurality of small rollers 16 are axially supported on free ends of this oscillation member 15. When the turned-back portion 3a of the flexible cable 3 is looped around these small rollers 16, the oscillation member 15 looped with the turned-back portion 3a is biased in oscillation toward the inner cylindrical unit 9 when the flexible cable 3 is wound densely on the outer cylindrical unit 8 but toward the outer cylindrical unit 8 when being wound densely on the inner cylindrical unit 9. Note that the oscillation member 15 and the small rollers 16 are replaceable with eccentric rollers 17 in which rotary shafts decenter. This eccentric roller 17 consists of a unit 17a rotating integrally with the shaft and a rotary roller unit 17b rotating independently of this.

Figure 9:
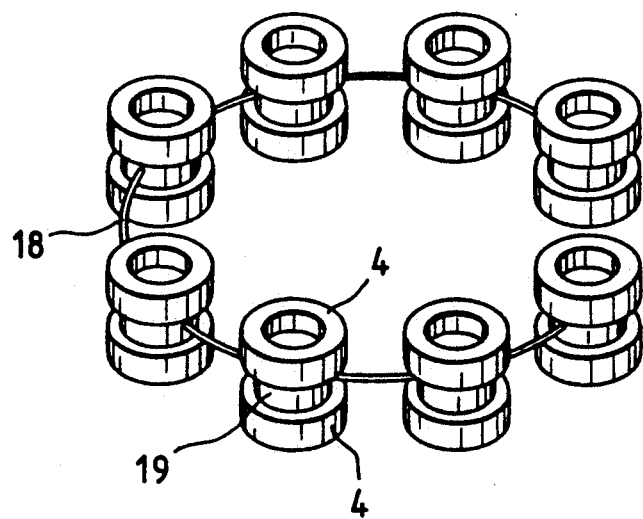
FIG. 9 is a perspective view showing an example of a variant form of a connecting member.

Further, the first embodiment discussed above has dealt with the case where the pair of C-shaped connecting plates 5 are employed as connecting members for connecting the plurality of rollers 4. As illustrated in FIG. 9, however, a C-shaped wire spring 18 used as a connecting member serves to connect a plurality of cylindrical units 19, and the rollers 4 may be axially supported on the respective cylindrical units 19.

Figure 10:
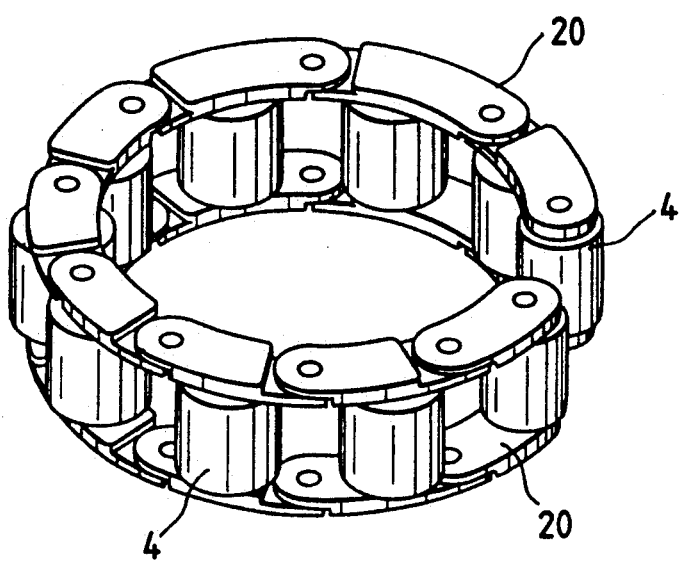
FIG. 10 is a perspective view showing an example of another variant form of the connecting member.

Besides, as depicted in FIG. 10, a chain-like member including a plurality of segments which are sequentially rotatably connected is used as a connecting member, and the rollers 4 may be axially supported between the respective segments of the chain-like member 20. In this case, the respective roller 4 moves while keeping predetermined pitches in the peripheral direction of the air space 11 and is movable independently of each other in the radial direction. Hence, the radial dimension of the air space 11 can be made shorter than in the first embodiment. This is advantageous for miniaturizing the clock spring connector. Further, if the clock spring connector has the same outside diameter dimension, the diameter dimension of the roller 4 can be set large, thereby making is possible to surely guide the flexible cable 3.

Figure 11:
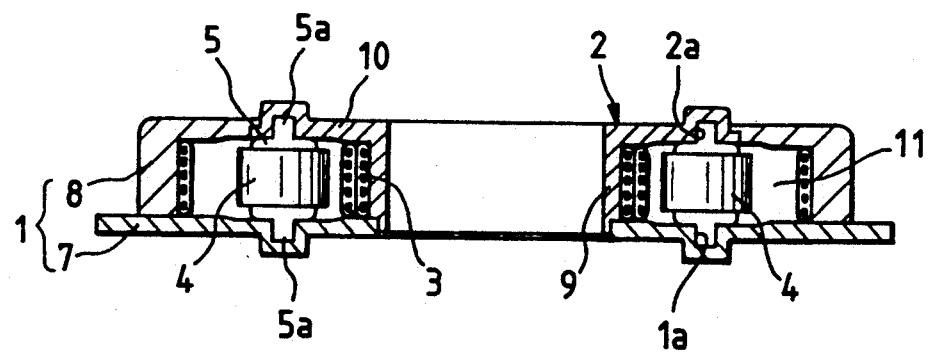
FIG. 11 is a sectional view depicting the clock spring connector in another embodiment of this invention.

Additionally, as in the embodiment shown in FIG. 11, the connecting plates 5 may be guided in the peripheral direction of the air space 11. To be more specific, the bottom plate of the lower case 1 and the top plate 10 of the upper case 2 are formed individually with recessed grooves 1a, 2a each assuming a ring-like shape in plane. Projections 5a provided on the two connecting plates 5 are slidably fitted into these recessed grooves 1a, 2a. These projections 5a may be either provided in a plurality of positions for plotting the loci of the ring-like recessed grooves 1a, 2a or formed in the same ring configuration with the recessed grooves 1a, 2a. In this way, the connecting plates 5 are guided in the peripheral direction, thereby preventing the connecting plates 5 from decentering. It is also possible to prevent an extraordinary load on the flexible cable 3 due to eccentricity of the connecting plates 5 and a configurational ununiformity of the flexible cable 3. Exhibited also are effects for preventing both noised of the clock spring connector and buckling of the flexible cable.

Figure 12:
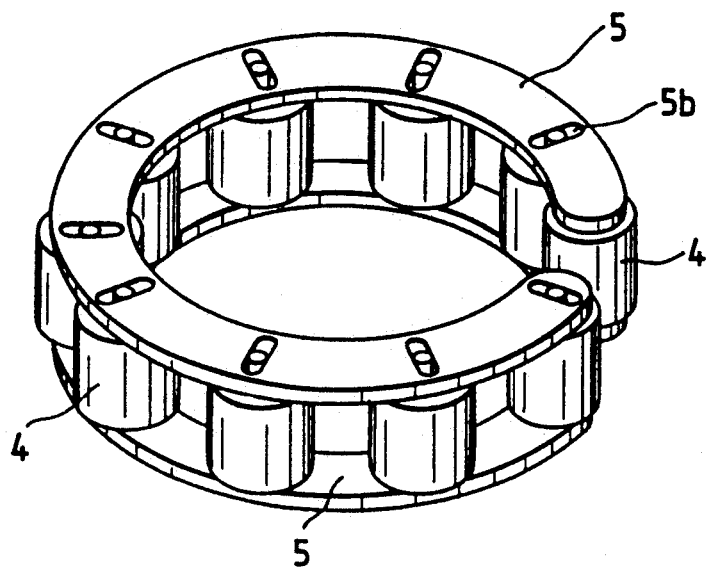
FIG. 12 is a perspective view showing an example of variant forms of the rollers and the connecting member.
Figure 13:
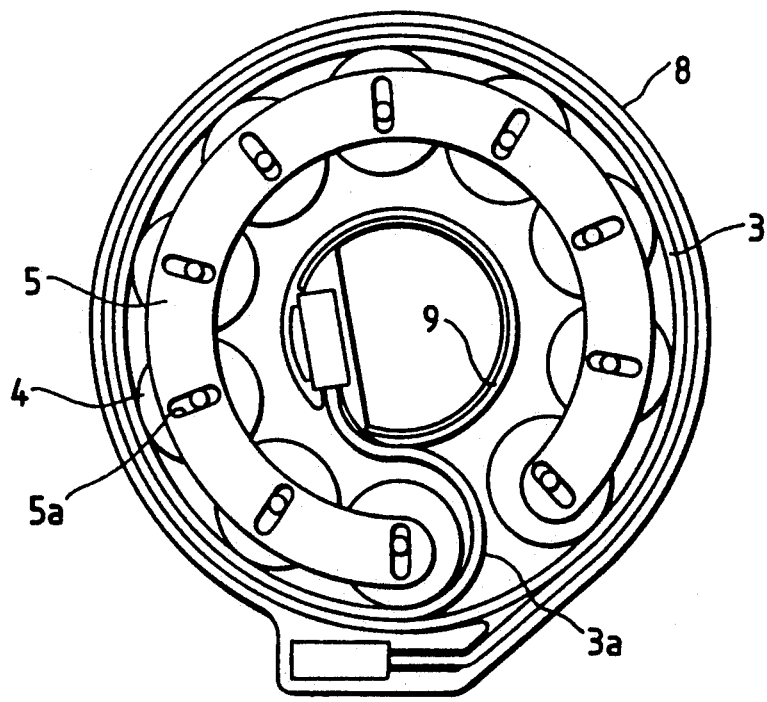
FIG. 13 is a plan view illustrating the clock spring connector using the connecting member of FIG. 12.
Figure 14:
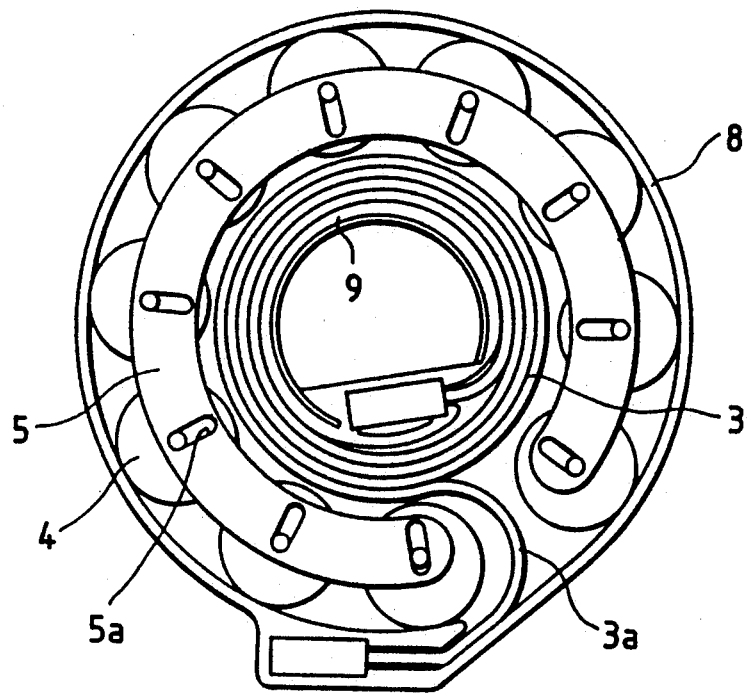
FIG. 14 is a plan view illustrating the operation of the clock spring connector of FIG. 13.

In accordance with an embodiment shown in FIG. 12, the connecting plates 5 are bored with a plurality of guide holes 5b extending in the radial direction, and the respective roller 4 are movable in the radial direction along the guide holes 5b. If constructed in this manner, as depicted in FIG. 13, the flexible cable 3 wound on the outer cylindrical member 8 forces the respective rollers 4 to move inwardly of the guide holes 5b, i.e., toward the inner cylindrical unit 9 when the flexible cable 3 is wound densely on the outer cylindrical unit 8. In reverse to this, as illustrated in FIG. 14, when the flexible cable 3 is wound densely on the inner cylindrical unit 9, the flexible cable 3 wound on the inner cylindrical unit 9 forces the respective roller 4 to move outwardly of the guide holes 5b, viz., towards the outer cylindrical unit 8. Therefore, the radial dimension of the air space 11 can be shorter than in the first embodiment. This is further advantageous for miniaturizing the clock spring connector. Simultaneously, if the outside diameter dimension of the clock spring connector is constant, the diameter of the roller 4 can be designed large. It is therefore possible to increase contact areas between the rollers 4 and the flexible cable 3, whereby the flexible cable can be guided more surely.

Figure 8:
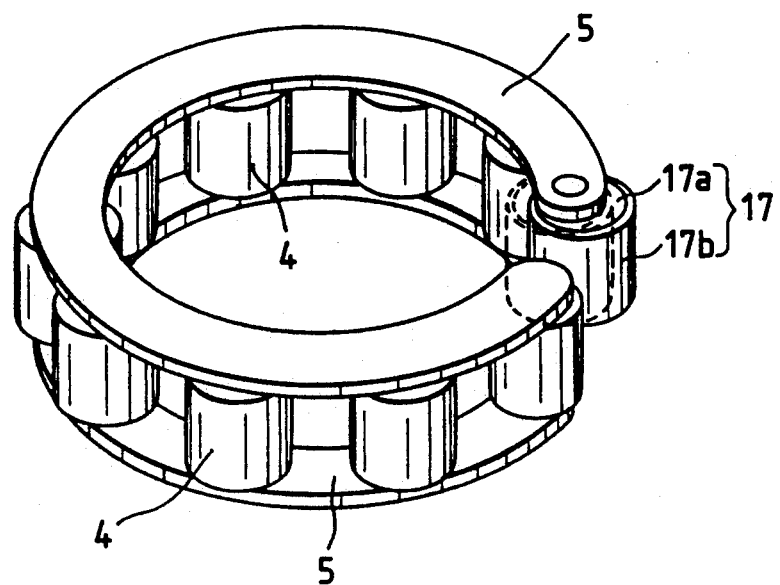
FIG. 8 is a perspective view showing an example of a further variant form of the rollers.

Turning now to FIG. 8, even when all the rollers 4 are replaced with the eccentric rollers 17, the same effects with the embodiment of FIG. 12 can be obtained.

Figure 15:
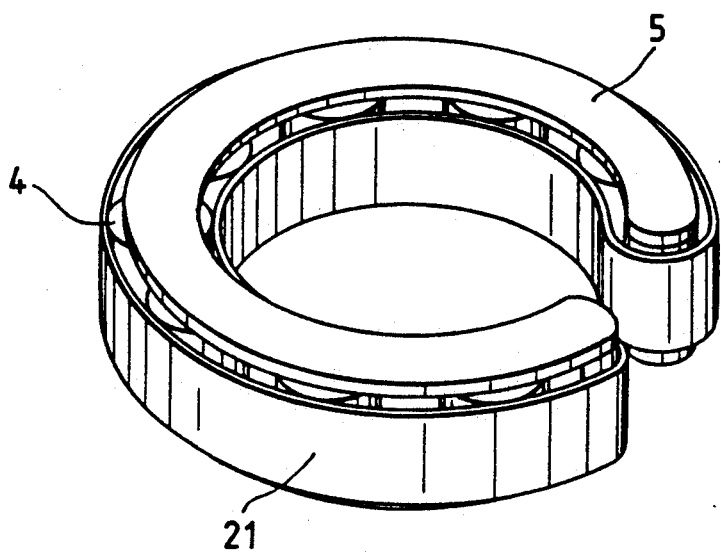
FIG. 15 is a perspective view showing an example of a variant form in which an endless belt is wound on the rollers.

Furthermore, each embodiment given above has dealt with the case where the flexible cable 3 directly contacts the respective rollers 4. As shown in FIG. 15, however, an endless belt 21 may be also wound on the individual rollers 4 so that the endless belt 21 is interposed between the flexible cable 3 and the respective rollers 4. In this case, even if an arrangement pitch between the rollers 4 increases, the flexible cable 3 is prevented from intruding in between the two adjacent rollers 4 due to the endless belt 21. The number of the rollers 4 required can be therefore reduced.

Figure 16:
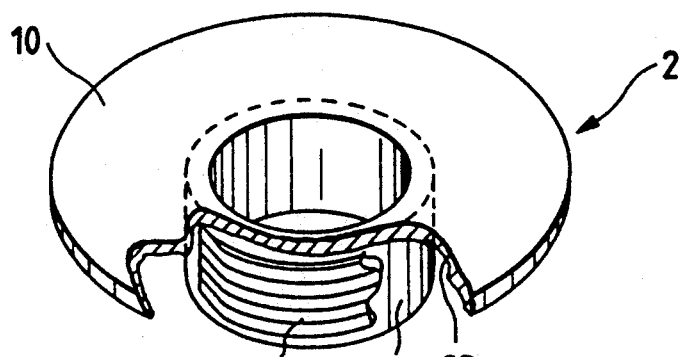
FIG. 16 is an exploded perspective view depicting the clock spring connector with some portions broken away in still another embodiment of the present invention.
Figure 16:
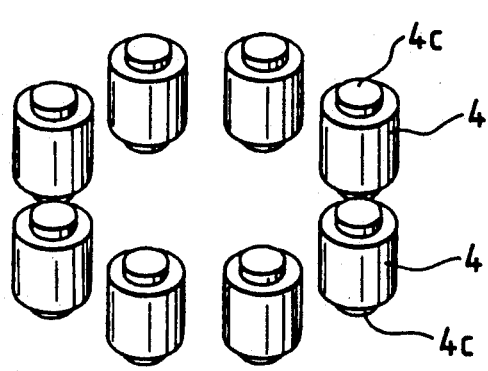
Figure 16:
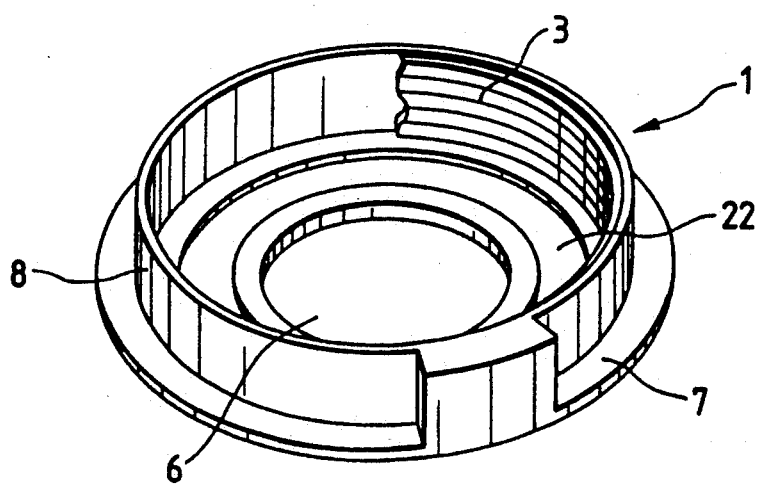
Figure 17:
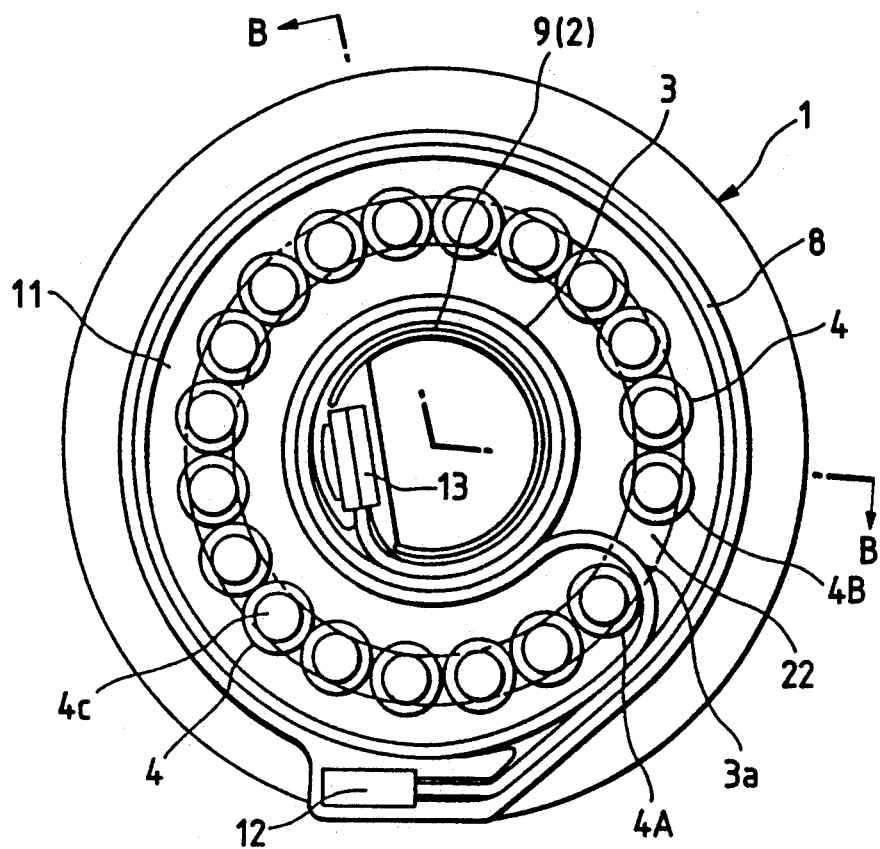
FIG. 17 is a plan view depicting the clock spring connector of FIG. 16, wherein the upper case is partly omitted.
Figure 18:
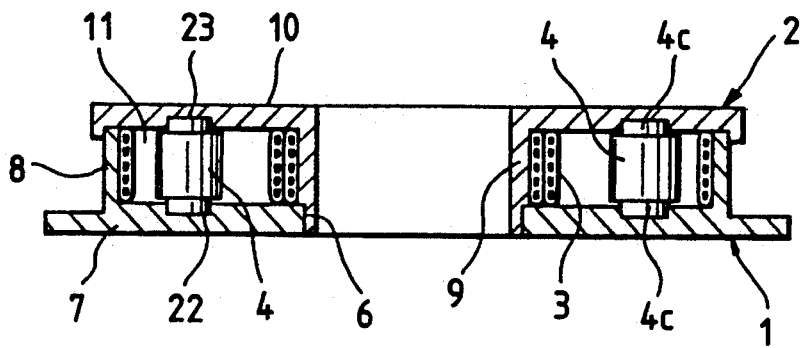
FIG. 18 is a sectional view taken substantially along the line B—B of FIG. 17.

FIG. 16 is an exploded perspective view illustrating the clock spring connector with some portions broken away in accordance with a second embodiment of this invention. FIG. 17 is a plan view illustrating the clock spring connector, wherein the upper case is partly omitted. FIG. 18 is a sectional view taken substantially along the line B—B of FIG. 17. The portions corresponding to those in the first embodiment discussed above are marked with the same numerals, and the repetitive explanations thereof will be omitted.

In the case of this embodiment, the bottom plate 7 of the lower case 1 and the top plate 10 of the upper case 2 are formed with guide grooves 22, 23 each assuming a ring-like configuration in plane but a recessed configuration in section so that the grooves confront each other. On the other hand, small-diameter portions 4c are provided at upper and lower ends of each rollers 4. These small-diameter portions 4c are inserted in the guide grooves 22, 23, thereby regulating a movement of each roller 4 in the radial direction of the air space 11. The roller 4 is thus so guided as to be movable only in the peripheral direction of the air space 11. Note that the turned-back portion 3a of the flexible cable 3 is positioned between two adjacent rollers (marked with the symbols 4A, 4B for explanatory convenience) among these rollers 4.

In the thus constructed clock spring connector in accordance with the second embodiment, when the upper case 2 is at first rotated clockwise from a state shown in FIG. 17, the turned-back portion 3a of the flexible cable 3 moves clockwise by a rotational quantity smaller than the upper case 2, and the flexible cable 3 having a length equivalent to the above-mentioned moving quantity is led out of the outer cylindrical unit 8 and tightly wound on the inner cylindrical unit 9. In this case, the turned-back portion 3a of the flexible cable 3 forces the roller 4A to move clockwise, with the result that all the rollers 4 move clockwise within the air space 11 while being guided by the guide grooves 22, 23. Therefore, with the respective rollers 4 which move in this manner, the flexible cable 3 wound on the outer cylindrical unit 8 is prevented from swell-biasing in the inner radial direction. The flexible cable 3 on the side of the outer cylindrical unit 8 is smoothly led out towards the turned-back portion 3a and tightly wound on the inner cylindrical unit 9.

In reverse to the above-mentioned, when the upper case 2 is rotated counterclockwise from the position illustrated in FIG. 17, the turned-back portion 3a of the flexible cable 3 moves counterclockwise by a rotational quantity smaller than the upper case 2. The flexible cable 3 having a length equivalent to the moving quantity is led out of the inner cylindrical unit 9 and rewound on the outer cylindrical unit 8. In this case, the turned-back portion 3a of the flexible cable 3 forces the roller 4B to move counterclockwise, with the result that all the rollers 4 move counterclockwise within the air space 11 while being guided by the guide grooves 22, 23. Hence, with the respective rollers 4 which thus move, the flexible cable 3 wound on the inner cylindrical unit 9 is prevented from swell-biasing in the outer radial direction. The flexible cable 3 on the side of the inner cylindrical unit 9 is smoothly led out towards the turned-back portion 3a and rewound on the outer cylindrical unit 8.

In the clock spring connector in accordance with the second embodiment, as in the same way with the first embodiment discussed above, the flexible cable 3 is wound reversely on the outer and inner cylindrical units 8, 9 through the turned-back portion 3a. It is therefore possible to reduce the length of the flexible cable 3 required, as a result of which the total costs can be reduced. At the same time, this gives an advantage for miniaturization. Further, the plurality of rollers 4 are interposed between the flexible cable 3 wound on the outer cylindrical unit 8 and the one wound on the inner cylindrical unit 9. These rollers 4 move in the peripheral direction within the air space 11 while following up the turned-back portion 3a. Hence, during the tight-wind or rewind operation, the rotating force of the upper case 2 is surely transmitted to the turned-back portion 3a of the flexible cable 3, thereby preventing such an inconvenience that the flexible cable 3 swells in the radial direction and is buckled on the way to the turned-back portion 3a.

Figure 19:
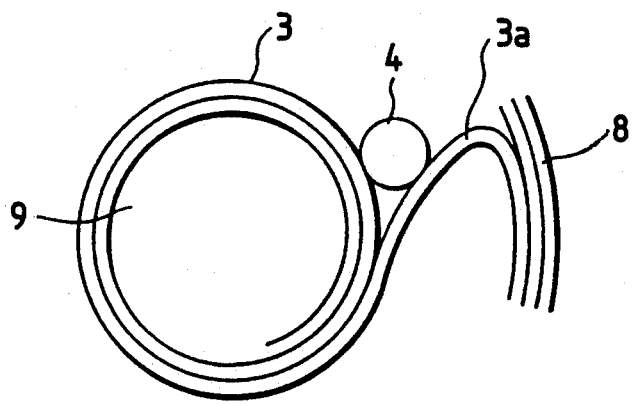
FIG. 19 is a schematic diagram of assistance in explaining the problems.
Figure 20:
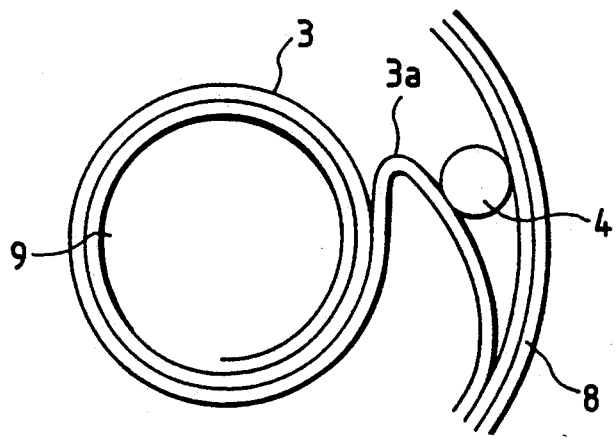
FIG. 20 is a schematic diagram of assistance in explaining the problems.
Figure 21:
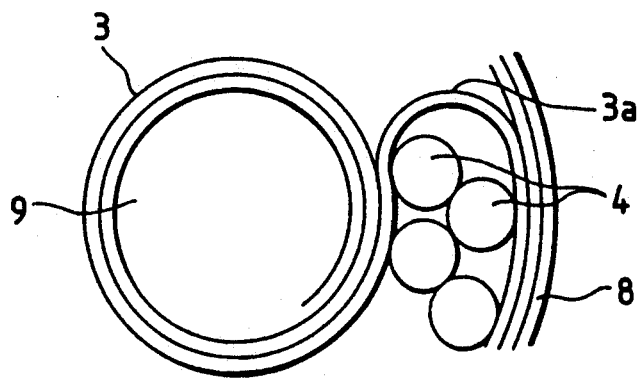
FIG. 21 is a schematic diagram of assistance in explaining the problems.

Besides, the small-diameter portions 4c of the respective rollers 4 are guided by the guide grooves 22, 23, whereby the rollers are movable only in the peripheral direction of the air space 11 but regulated in terms of the radial movement. Hence, there is no possibility in which, as illustrated in FIG. 19, the roller 4 intrudes into a gap of the turned-back portion 3a on the side of the inner cylindrical unit 9 or, as depicted in FIG. 20, intrudes into a gap of the turned-back portion 3a on the side of the outer cylindrical unit 8. The flexible cable 3 can be prevented from being buckled at the turned-back portion 3a. Further, since the respective rollers 4 are regulated so as not move in the radial direction, as illustrated in FIG. 21, the plurality of rollers 4 are not entangled with each other inwardly of the turned-back portion 3a. For this reason, the turned-back portion 3a is smoothly movable, and it is possible to smoothly effect the tight-wind or rewind operation.

Note that the second embodiment discussed above has dealt with the case where the small-diameter portions 4c of the individual rollers 4 are guided by the guide grooves 22, 23 formed in the lower and upper cases 1, 2. However, cylindrical rollers 4 with no small-diameter portion may be also usable. The roller 4 may be guided by the guide groove of any one of the lower and upper cases 1, 2. In addition, a relation opposite to that in the above-described embodiment is given as a guide means of the roller 4. Namely, at least one of the lower and upper cases 1, 2 may be provided with a projection assuming a ring-like shape in plane but a protruded shape in section. The roller 4 may be formed with a recessed groove engaging with the protrusion.

Figure 22:
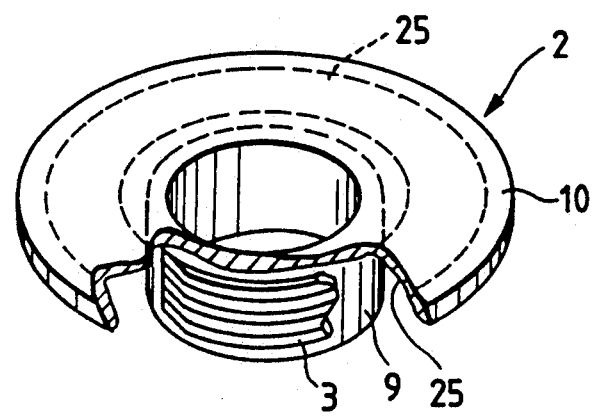
FIG. 22 is an exploded perspective view depicting the clock spring connector with some portions broken away in a further embodiment of this invention.
Figure 22:
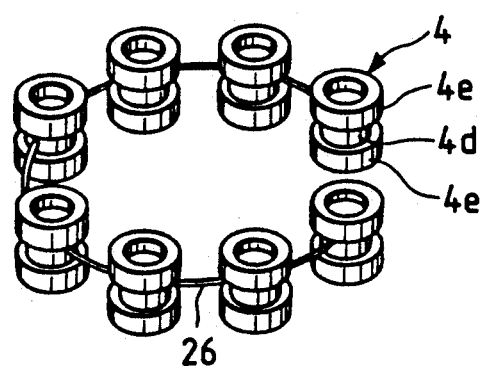
Figure 22:
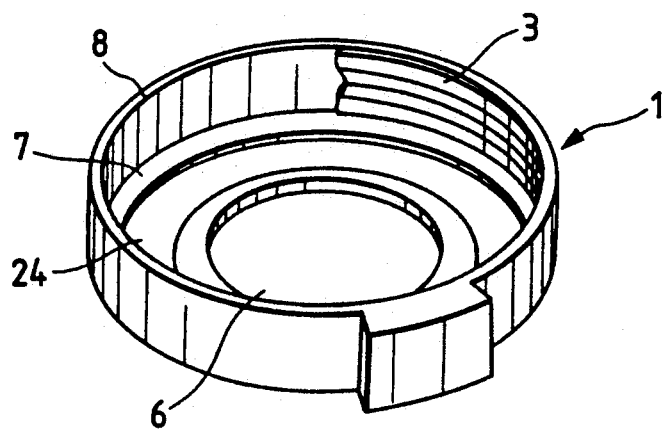
Figure 23:
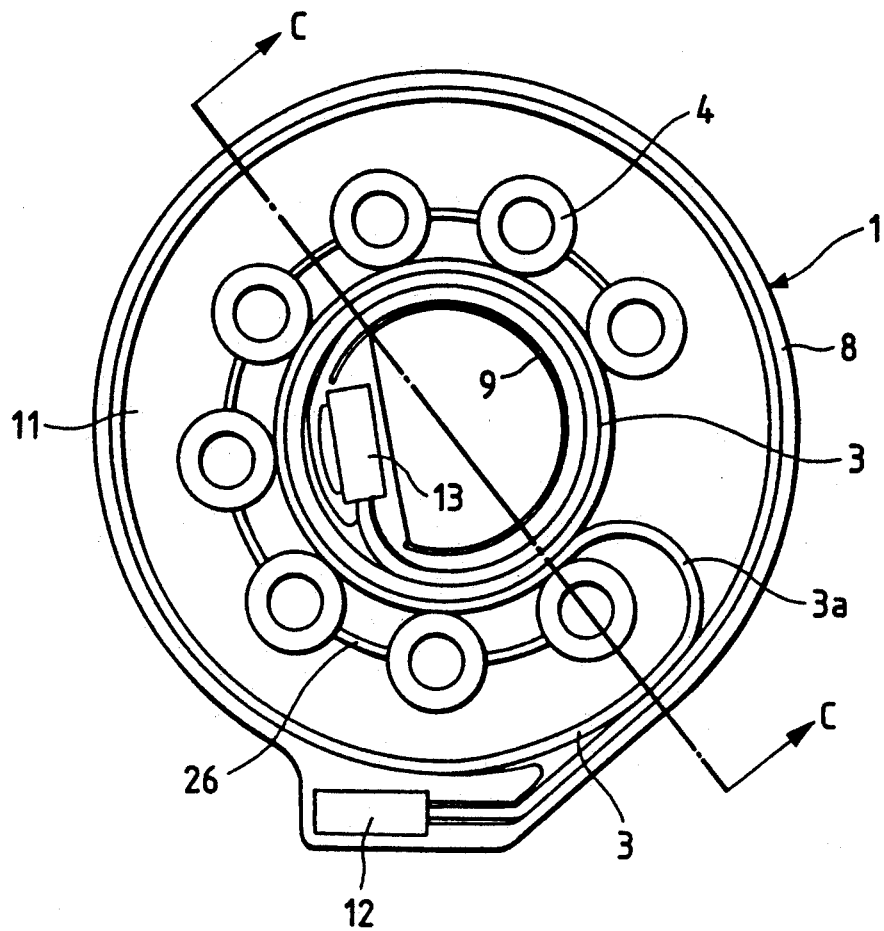
FIG. 23 is a plan view illustrating the clock spring connector FIG. 22, wherein the upper case is partly omitted.
Figure 24:
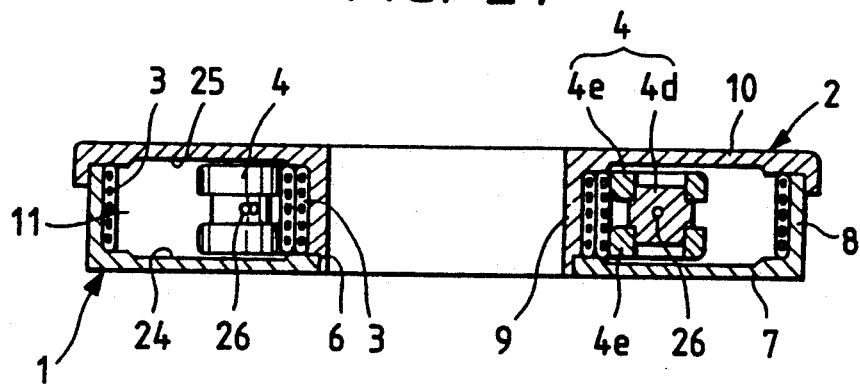
FIG. 24 is a sectional view taken substantially along the line C—C of FIG. 23.

FIG. 22 is an exploded perspective view illustrating the clock spring connector with some portions broken away in a third embodiment of the present invention. FIG. 23 is a plan view showing the clock spring connector, wherein the upper case is partly omitted. FIG. 24 is a sectional view taken substantially along the line C—C of FIG. 23. The portions corresponding to those in the first embodiment are marked with the same numerals, and the repetitive explanations thereof will be omitted.

In the case of this embodiment, the bottom plate 7 of the lower case 1 and the top plate 10 of the upper case 2 include the relatively wide recessed grooves 24, 25 which are formed in the surfaces confronting each other. As is obvious from FIG. 24, the air space 11 for housing the flexible cable 3 takes such a shape that the central part thereof is swelled in the up-and-down directions because of those recessed grooves 24, 25. Further, the roller 4 consists of a circular cylindrical unit 4d and a rotary member 4e rotatably supported at the upper and lower ends thereof. A wire spring 26 formed in a C-like configuration penetrates each circular cylindrical unit 4d, whereby the rollers are connected so as not to separate from each other. The rollers are biased by an inward elastic biasing force of the wire spring 26 so that the rollers are brought into press-contact with the outer peripheral surface of the inner cylindrical unit 9.

On the occasion of use, to begin with, when the upper case 2 is rotated clockwise from the state shown in FIG. 23, the turned-back portion 3a of the flexible cable 3 moves clockwise by a rotational quantity smaller than the upper case 2, and the flexible cable 3 having a length equivalent to the above-mentioned moving quantity is led out of the outer cylindrical unit 8 and tightly wound on the inner cylindrical member 9. In this case, the turned-back portion 3a of the flexible cable 3 forces this roller 4 to move clockwise (revolution) while causing rotations (autorotations) of the rotary member 4e of the roller 4 at one end, with the result that all the rollers 4 move clockwise as they remain connected to the wire spring 26. Therefore, with the respective rollers 4 which move in this manner, the flexible cable 3 wound on the outer cylindrical unit 8 is prevented from swell-biasing in the inner radial direction. Further, the turned-back portion 3a moves so that both ends in the crosswise direction do not contact the bottom plate 7 and the top plate 10 as well owing to existences of the recessed grooves 24, 25. Hence, the flexible cable 3 on the side of the outer cylindrical unit 8 is smoothly led out towards the turned-back portion 3a and tightly wound on the inner cylindrical unit 9.

In reverse to the above-mentioned, when the upper case 2 is rotated counterclockwise from the position illustrated in FIG. 2, the turned-back portion 3a of the flexible cable 3 moves counterclockwise by a rotational quantity smaller than the upper case 2. The flexible cable 3 having a length equivalent to the moving quantity is led out of the inner cylindrical unit 9 and rewound on the outer cylindrical unit 8. In this case, the turned-back portion 3a of the flexible cable 3 forces this roller 4 to move counterclockwise while causing rotations of the rotary member 4e of the roller 4 opposite to the roller 4 looped therewith, with the result that all the rollers 4 move counterclockwise as they remain connected to the wire spring 26. Hence, with the respective rollers 4 which thus move while being elastically biased inwards, the flexible cable 3 wound on the inner cylindrical unit 9 is prevented from swell-biasing in the outer radial direction. In addition, the turned-back portion 3a moves without contacting the bottom plate 7 and the top plate 10 as well because of existences of the recessed grooves 24, 25, and therefore the flexible cable 3 on the side of the inner cylindrical unit 9 is smoothly led out towards the turned-back portion 3a and rewound on the outer cylindrical unit 8.

In the clock spring connector in accordance with the third embodiment, as in the same way with the first and second embodiments discussed above, the flexible cable 3 is wound reversely on the outer and inner cylindrical units 8, 9 through the turned-back portion 3a. It is therefore possible to reduce the length of the flexible cable 3 required, as a result of which the total costs can be reduced. At the same time, this gives an advantage for miniaturization. Further, the plurality of rollers 4 are interposed between the flexible cable 3 wound on the outer cylindrical unit 8 and the one wound on the inner cylindrical unit 9. These rollers 4 move in the follow after the turned-back portion 3a while keeping the constant intervals as they remain connected to the wire spring 26. Hence, during the tight-wind or rewind operation, it is possible to prevent such an inconvenience that the flexible cable 3 swells in the radial direction and is buckled on the way to the turned-back portion 3a. Besides, the recessed grooves 24, 25 for avoiding the contact with both ends of the turned-back portion 3a in the crosswise direction are formed in the rotational loci of the turned-back portion 3a. Therefore, even if the turned-back portion 3a is swelled in the crosswise direction due to abrupt bending, the recessed grooves 24, 25 serve to prevent the turned-back portion 3a from the press-contact with the bottom plate 7 of the lower case 1 and the top plate of the upper case 2. As a result, the tight-wind or rewind operation can be surely performed by smoothly moving the turned-back portion 3a irrespective of the rotating directions of the upper case 2.

Figure 25:
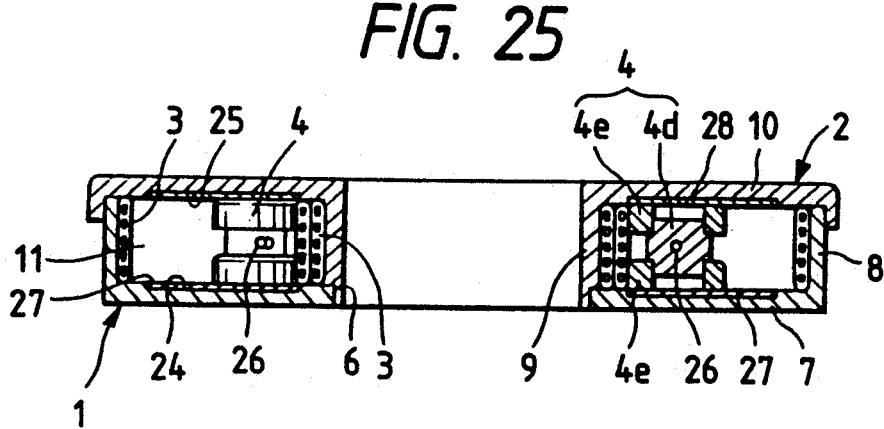
FIG. 25 is a vertical sectional view illustrating the clock spring connector in a still further embodiment of this invention.
Figure 26:
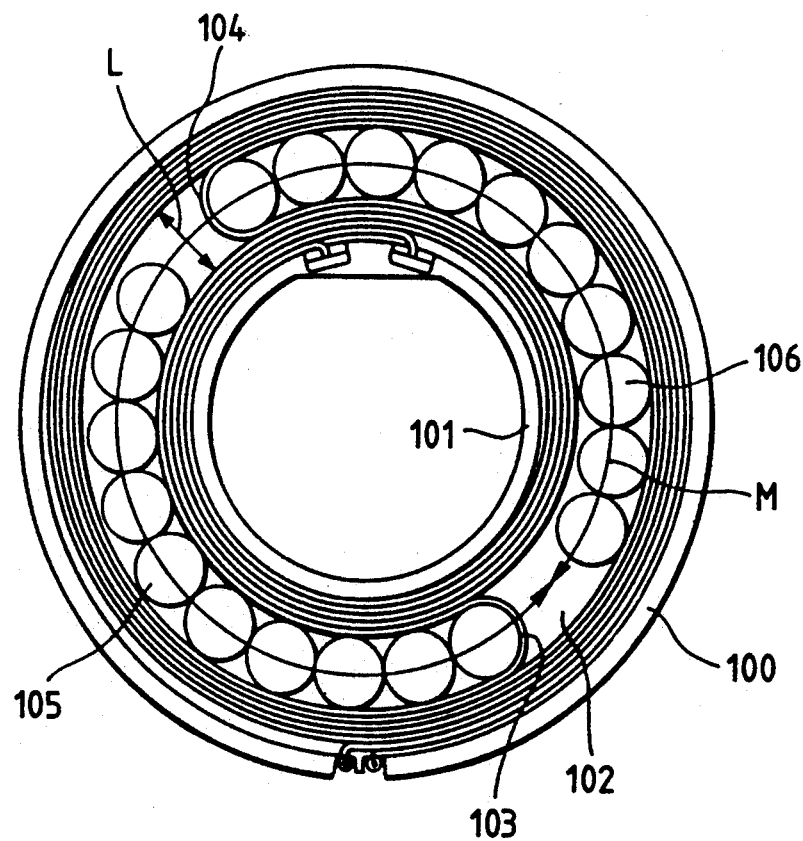
FIG. 26 is a plan view depicting a clock spring connector in an conventional example.

Note that, as illustrated in FIG. 25, slidable sheets 27, 28 composed of a material such as Teflon or the like exhibiting an excellent slidableness are stuck to the recessed grooves 24, 25. Slight clearances may be formed between these slide sheets 27, 28 and the both ends of the turned-back portion 3a in the crosswise direction. In this case, although the two crosswise ends of the turned-back portion 3a contact the slide sheets 27, 28 during its movement, contact resistances thereof are extremely small. The effects are somewhat inferior to the third embodiment. However, the turned-back portion 3a can be moved smoothly.

Further, the third embodiment discussed above has dealt with the case where the respective rollers 4 are biased towards the outer peripheral surface of the inner cylindrical unit 9 with the aid of the wire spring 26 to which the inward elastic biasing force is imparted. In reverse to this, the individual rollers may be biased towards the inner peripheral surface of the outer cylindrical unit with the aid of the wire spring to which an outward elastic biasing force is imparted; or alternatively, one end of a C-shaped moving member receiving no particular elastic biasing force is looped with the turned-back portion, and a revolution of this moving member may be caused by the flexible cable. In addition, the recessed grooves 24, 25 are not necessarily provided in the bottom plate 7 of the lower case 1 and the top plate 10 of the upper case 10. Any one of the recessed grooves may be omitted, though the effects decline to some extent.

According to the present invention, as a matter of course, a variety of examples of variant forms other than the above-mentioned are practicable. For instance, a flexible cable known as a round cable in which a conductor is covered with an insulating tube is usable in place of the flat cable exemplified as the flexible cable 3 in the respective embodiments. In this instance, a plurality of round cables may be unified in a band-like shape corresponding to the number of circuits required.

Further, each of the embodiments discussed above has dealt with the case where the lower case 1 is used as a fixed member, while the upper case is employed as a movable member. In reverse to this, however, the upper case 2 is usable as a fixed member, while the lower case 1 is usable as a movable member.

Although the illustrative embodiment of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A clockspring connector comprising:
    a fixed member having a first cylindrical unit;
    a movable member having a second cylindrical unit and so mounted as to be rotatable relative to said fixed member;
    a flexible cable accommodated in a ring-like air space defined by said first and second cylindrical units, said flexible cable being wound reversely on said first and second cylindrical units through a turned-back portion,
    characterized in that a plurality of rollers for regulating a radial movement of said flexible cable are provided in the peripheral direction within said air space and connected by a connecting member, and
    wherein said connecting member assumes a chain-like configuration adapted to rotatably connect a plurality of segments.

2. A clockspring connector according to claim 1, wherein said connecting member engages with an annular concave portion provided on a surface of one of said fixed member and said movable member.

3. A clockspring connector of claim 1, wherein each of said rollers is movably connected to one of said plurality of segments such that said rollers are movable relative to said connecting member in a radial direction.

4. A clockspring connector comprising:
a fixed member having a first cylindrical unit;
a movable member having a second cylindrical unit and so mounted as to be rotatable relative to said fixed member;
a flexible cable disposed in an annular space defined by said first and second cylindrical units, said flexible cable being wound reversively on said first and second cylindrical units through a turned-back portion; and
a plurality of rollers disposed in said annular space, each of said plurality of rollers freely rotatable about an associated axis and including first and second protrusions extending along an associated axis, said turned-back portion being disposed between two of said plurality of rollers;
wherein a first annular groove is formed on a ceiling of said annular space,
wherein a second annular groove is formed on a bottom of said annular space, and
wherein said first protrusion is slidably engaged with said first annular groove and said second protrusion is slidably engaged with said second annular groove, thereby preventing radial displacement of said plurality of rollers within said annular space.

5. A clock spring connector comprising:
a fixed member having a first cylindrical unit;
a movable member having a second cylindrical unit and so mounted as to be rotatable relative to said fixed member;
a flexible cable accommodated in a ring-like space defined by said first and second cylindrical units, said flexible cable being wound on said first cylindrical unit in a first direction, and then by a turned-back portion thereof, wound on said second cylindrical unit in a second direction opposite to the first direction; and
a ring-shaped recessed portion provided on an opposing surface of at least one of the members which constitute a ceiling and a bottom of an air space, said ring-shaped recessed portion being located such that said turned-back portion of said flexible cable is separated from said opposing surface.

6. A clockspring connector comprising:
a fixed member comprising a first cylindrical portion;
a movable member rotatably connected to the fixed member, said movable member comprising a second cylindrical portion disposed concentrically with the first cylindrical portion, said fixed member and said movable members defining an annular space between said first and second cylindrical portions;
a flexible cable disposed in the annular space, said flexible cable having a first portion wound on the first cylindrical member in a first direction, a second portion wound on the second cylindrical member in a second direction, and a turned-back portion disposed between the first and second portions;
a connecting member freely rotatably disposed in the annular space, said connecting member including an opening through which the turned-back portion is disposed; and
a plurality of rollers connected to said connecting member;
wherein a ceiling and/or bottom of said annular space includes an annular groove; and
wherein said connecting member is slidably engaged with said annular groove such that said connecting member rotates concentrically within said annular space.

7. A clockspring connector according to claim 6 wherein said connecting member includes a protrusion slidably engaged with said annular groove such that said connecting member rotates concentrically within said annular space.

8. A clockspring connector comprising:
a fixed member comprising a first cylindrical portion;
a movable member rotatably connected to the fixed member, said movable member comprising a second cylindrical portion disposed concentrically with the first cylindrical portion, said fixed member and said movable members defining an annular space between said first and second cylindrical portions;
a flexible cable disposed in the annular space, said flexible cable having a first portion wound on the first cylindrical member in a first direction, a second portion wound on the second cylindrical member in a second direction, and a turned-back portion disposed between the first and second portions;
a connecting member freely rotatably disposed in the annular space, said connecting member including an opening through which the turned-back portion is disposed; and
a plurality of rollers connected to said connecting member;
wherein said connecting member comprises a wire spring connected between said plurality of rollers.

9. A clockspring connector comprising:
a fixed member comprising a first cylindrical portion;
a movable member rotatably connected to the fixed member, said movable member comprising a second cylindrical portion disposed concentrically with the first cylindrical portion, said fixed member and said movable members defining an annular space between said first and second cylindrical portions;
a flexible cable disposed in the annular space, said flexible cable having a first portion wound on the first cylindrical member in a first direction, a second portion wound on the second cylindrical member in a second direction, and a turned-back portion disposed between the first and second portions;
a connecting member freely rotatably disposed in the annular space, said connecting member including an opening through which the turned-back portion is disposed; and
a plurality of rollers connected to said connecting member;
wherein said plurality of rollers are movably connected to said connecting member such that each of said rollers is movable in a radial direction relative to said connecting member.

* * * * *